United States Patent
Eck

(10) Patent No.: US 8,443,966 B2
(45) Date of Patent: May 21, 2013

(54) DEVICE FOR TRANSPORTING FREIGHT

(75) Inventor: Alexander Eck, Poppenhausen (DE)

(73) Assignee: Wittenstein AG, Igersheim (DE)

( * ) Notice: Subject to any disclaimer, the term of this patent is extended or adjusted under 35 U.S.C. 154(b) by 0 days.

(21) Appl. No.: 12/442,489

(22) PCT Filed: May 9, 2008

(86) PCT No.: PCT/EP2008/003753
§ 371 (c)(1),
(2), (4) Date: Apr. 20, 2009

(87) PCT Pub. No.: WO2008/141738
PCT Pub. Date: Nov. 27, 2008

(65) Prior Publication Data
US 2010/0181168 A1    Jul. 22, 2010

(30) Foreign Application Priority Data

May 21, 2007    (DE) .................. 10 2007 023 835

(51) Int. Cl.
*B65G 13/02*    (2006.01)
*B65G 13/06*    (2006.01)
*B65G 13/12*    (2006.01)

(52) U.S. Cl.
USPC ............................................ 198/782; 198/788

(58) Field of Classification Search
None
See application file for complete search history.

(56) References Cited

U.S. PATENT DOCUMENTS

| | | | | |
|---|---|---|---|---|
| 3,698,539 A | * | 10/1972 | Schwarzbeck | 198/722 |
| 4,697,694 A | * | 10/1987 | Huber | 198/782 |
| 4,949,837 A | * | 8/1990 | Huber | 198/782 |
| 5,131,527 A | * | 7/1992 | Huber | 198/782 |
| 7,014,038 B2 | * | 3/2006 | Leingang et al. | 198/782 |
| 2006/0291983 A1 | | 12/2006 | Konig et al. | |

FOREIGN PATENT DOCUMENTS

| | | |
|---|---|---|
| DE | 196 08 236 | 5/1997 |
| DE | 102005030058 | 1/2007 |

* cited by examiner

*Primary Examiner* — Kavel Singh
(74) *Attorney, Agent, or Firm* — Bachman & LaPointe, P.C.

(57) ABSTRACT

A device for transporting freight, especially freight containers in the cargo compartments of aircraft, especially to a power drive unit (PDU) having a drive roller (5) received in a frame (1) and a lifting unit (6) wherein the lifting unit (6) comprises at least one drive unit (9) for listing the drive roller (5) on both sides.

6 Claims, 3 Drawing Sheets

DEVICE FOR TRANSPORTING FREIGHT

BACKGROUND OF THE INVENTION

The present invention relates to a device for transporting freight, in particular freight containers in freight compartments of aircraft, in particular power drive unit (PDU) having a drive cylinder, which is mounted in a frame, and having a lifting unit.

In conventional devices for transporting freight, in particular freight containers in freight compartments of aircraft, use is made of power drive units (PDU) which have a very complicated mechanical lifting unit in order to pivot out a drive cylinder, and press said drive cylinder against, an item of freight to be transported, such as for example against a base of a freight container, in order to actively or passively move said item of freight.

High demands are made in particular of such lifting units of PDUs. Said lifting units are subjected to very high mechanical loading and must therefore work reliably during operation.

A disadvantage is that, previously, use has been made of mechanically complex systems and drives in order, for example by means of eccentric cams, to move the lifting unit and therefore the drive cylinder out of the frame region of the PDU.

The present invention is therefore based on the object of creating a device of the type specified in the introduction, which device eliminates the stated disadvantages and by means of which device a drive cylinder can be pivoted out of a frame in a very simple and cost-effective manner. Here, it should be possible to realize very high lifting forces by means of a lifting unit, wherein a synchronous deployment and outward movement of the drive cylinder out of the frame should also simultaneously be possible. Furthermore, it should be possible for the pivoting-out and pivoting-in movements to be provided by means of a very space-saving lifting unit.

SUMMARY OF THE INVENTION

The foregoing object is achieved in that at least one drive unit for raising the drive cylinder at both sides is provided in the lifting unit.

In the present invention, it has proven to be particularly advantageous that the lifting unit is inserted in a very space-saving manner between two frame limbs of a frame and is driven in rotation by a hollow shaft of the lifting unit in order to transmit a very high drive torque.

Profilings formed as cam disks, eccentrics, cams or the like adjoin the hollow shaft at each end side, in order to pivot out or retract corresponding auxiliary frames which engage into the profiling and between which a drive cylinder is fixed. Here, it has proven to be advantageous to integrate a drive unit within the hollow shaft of the lifting unit, which drive unit is formed substantially by at least one electric motor and a planetary gear set. It has proven to be advantageous to fix a drive output planet gear carrier with respect to the frame limb at one end and, at the other end, to fix a motor retaining shaft in the other frame limb.

In this way, it is possible by means of the electric motor to drive the planetary gear set, which is preferably embodied as a three-stage planetary gear set, with the respective planets of the planetary gear set meshing at the inside with the hollow shaft of the lifting unit, and with a very high torque therefore being transmitted to the hollow shaft of the lifting unit for an extremely small installation space and installation weight.

To synchronously raise the two frame limbs and therefore the drive cylinder, corresponding rolling elements engage into a profiling, cam disk or the like at the end of the hollow shaft, with it being possible in this way for the drive cylinder or the two auxiliary frames to be synchronously pivoted out of and retracted back into the frame.

A further advantage of the present invention is that the device can be a very compact PDU with a low installation weight and small spatial requirement, wherein the drive cylinder can be pivoted out and retracted at both sides and synchronously in a simple manner by rotating the lifting unit as a hollow shaft.

BRIEF DESCRIPTION OF THE DRAWINGS

Further advantages, features and details of the invention can be gathered from the following description of preferred exemplary embodiments and on the basis of the drawing, in which.

DETAILED DESCRIPTION

Figure 1:
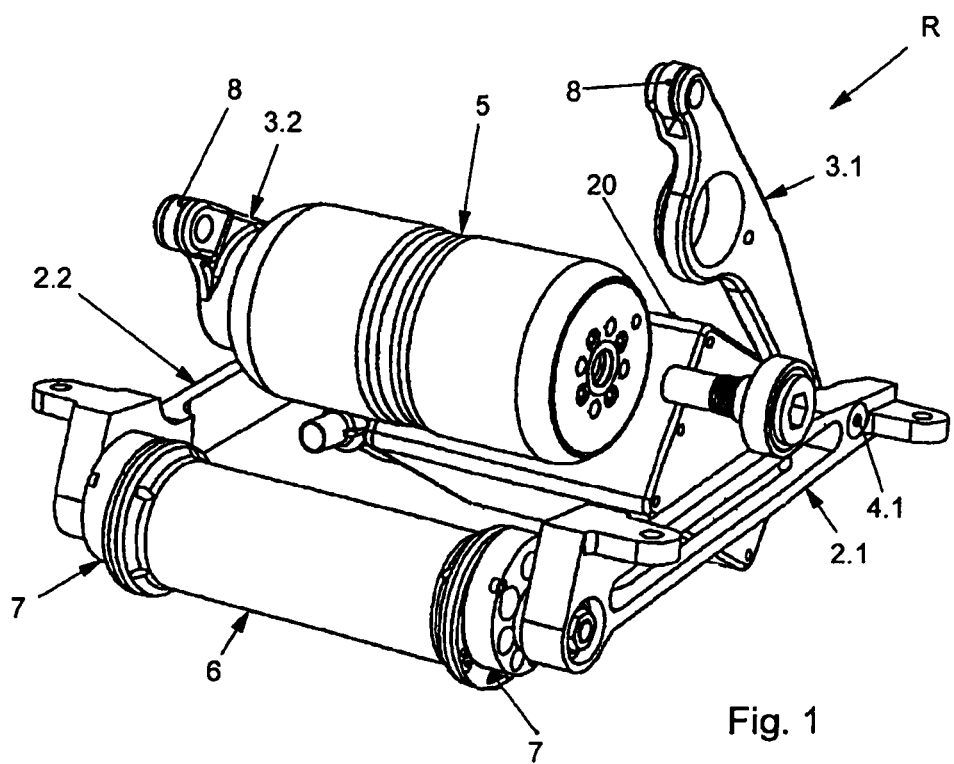
FIG. 1 shows a perspective view of a device for transporting freight, in a use position.

According to FIG. 1, a device R for transporting freight, in particular freight containers in freight compartments of aircraft, has a frame 1 which is formed from two individual frame limbs 2.1, 2.2.

Figure 2:
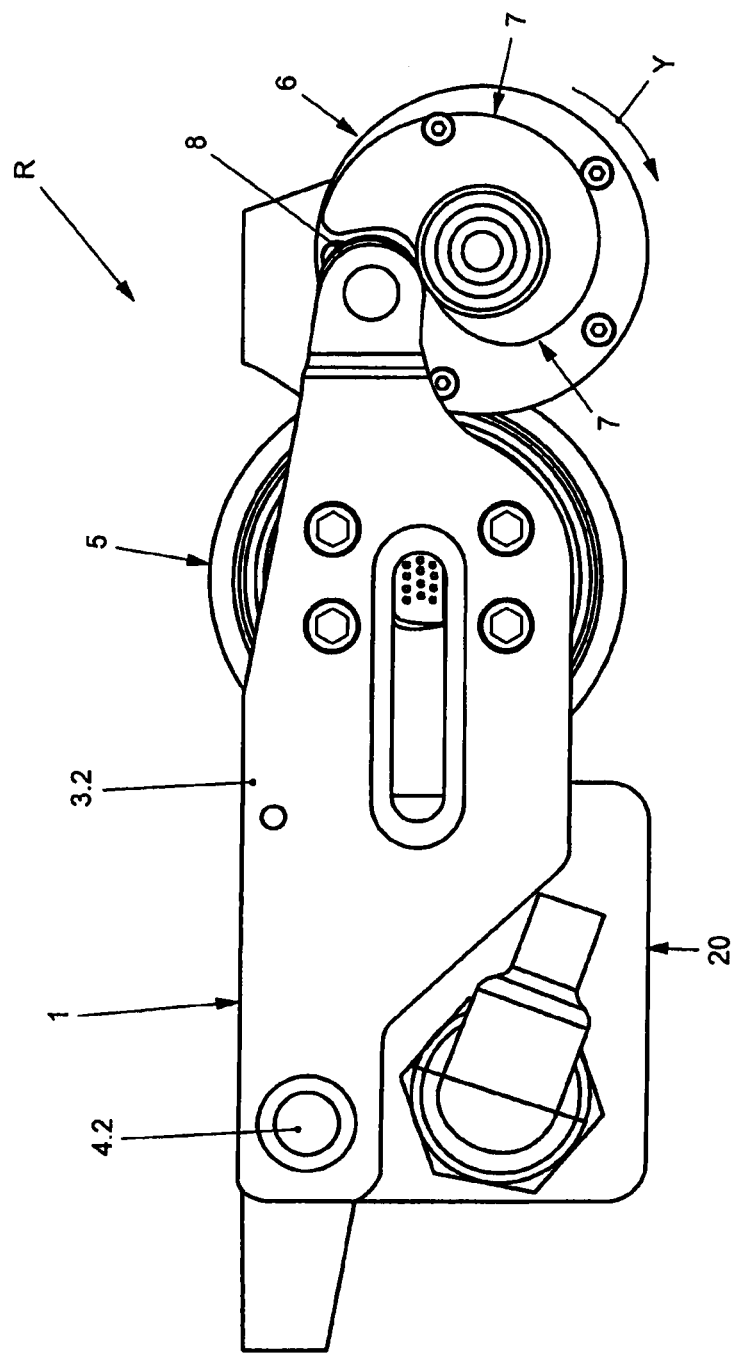
FIG. 2 shows a side view of the device as per FIG. 1 in a rest position.
Figure 3:
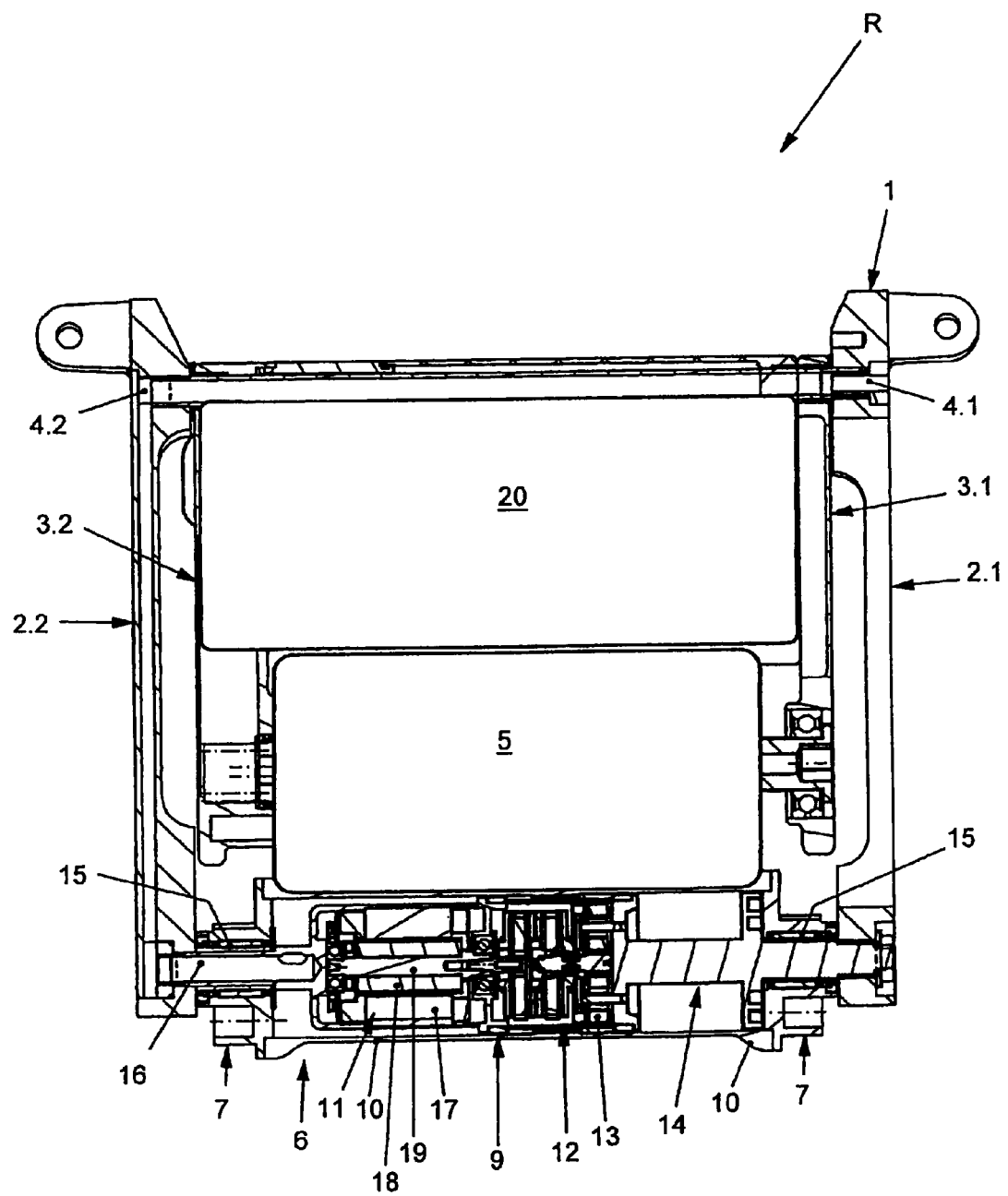
FIG. 3 shows a partial longitudinal section through a lifting unit as per FIG. 1.

At one end of the two frame limbs 2.1, 2.2, an auxiliary frame 3.1, 3.2 is pivotably mounted at the inside by means of joints 4.1, 4.2 (merely indicated here) as can also be seen from FIGS. 2 and 3. A drive cylinder 5 is mounted, such that it can be driven in rotation, between the auxiliary frames 3.1, 3.2 at one end of the latter, with the drive cylinder 5 preferably being fastened to the auxiliary frame 3.2 in a fixed manner and so as to be rotatable with respect to the auxiliary frame 3.1. To place the drive cylinder 5 in contact with an item of freight to be transported, in particular with freight containers, a lifting unit 6 is inserted preferably at the end side between the frame limbs 2.1, 2.2.

The lifting unit 6 has corresponding profilings 7 at the end side, as indicated in FIG. 1 and illustrated in more detail in FIGS. 2 and 3, which profilings 7 are preferably embodied as cam disks, as illustrated in particular in FIG. 2.

It can be seen from FIG. 2 that the auxiliary frame 3 bears at the end side against the profiling 7, in particular cam disk, eccentric, cam or the like, by means of a rolling element 8 which is assigned to said auxiliary frame 3, and an outward movement of the auxiliary frames 3.1, 3.2 with respect to the frame 1 in a pivotable manner about the joints 4.1, 4.2 is enabled by means of a corresponding active rotation of the lifting unit 6, as indicated in the arrow direction Y.

In the present invention, it has proven to be particularly advantageous for at least one drive unit 9 to be integrated in the lifting unit 6, which drive unit 9 drives or moves the lifting unit 6, in particular the hollow shaft 10 thereof, in or counter to the arrow direction Y.

Here, it has proven to be particularly advantageous for the profilings 7, in particular cam disks, to adjoin the hollow shaft 10 in each case at the end sides, which profilings 7 are in engagement with the rolling elements 8 and the auxiliary frames 3.1, 3.2.

In this way, the auxiliary frames 3.1, 3.2 and therefore also the drive cylinder 5 are moved out of the frame limbs 2.1, 2.2 against an item of freight, in particular a freight container, absolutely synchronously and simultaneously by simply driving the hollow shaft 10.

The drive unit 9 is inserted within the hollow shaft 10 and is composed substantially of an electric motor 11 and adjoining planetary gear set 12.

In the present invention, it has proven to be particularly advantageous for the planetary gear set 12, in particular the planets 13 thereof, to mesh with the hollow shaft 10 of the lifting unit 6 in a rotatable manner in order to ensure the lifting drive or in order to raise and lower the drive cylinder 5.

Here, a drive output planet carrier 14 is seated at the end side so as to be fixedly inserted in the frame limb 2.1, which drive output planet carrier 14, at one side in the end-side region in the region of the profiling 7, serves to rotatably mount the hollow shaft 10 by means of bearings 15, with a motor retaining shaft 16 being provided at the other end in the frame limb 2.2, on which motor retaining shaft 16 the other end of the hollow shaft 10 is likewise rotatably mounted in the region of the end-side profiling 7 by means of further bearings 15.

Adjacent to the motor retaining shaft 16, a stator 17 of the electric motor 11 is connected, coaxially, to the motor retaining shaft 16 as a stationary part.

For the end-side connection to the motor retaining shaft 16, a rotor 18 with rotor shaft 19 adjoins, and said rotor 18 produces the drive to the single-stage, preferably to the three-stage planetary gear set 12.

As a result of the fixing of the drive output planet carrier 14, the corresponding planets 13 then drive the outer hollow shaft 10 of the lifting unit 6 for the rotational movement of the profiling 7, in particular cam disks, eccentrics and cams or the like, in order to move the auxiliary frames 3.1, 3.2 and therefore the drive cylinder 5 out of the region of the frame limbs 2.1, 2.2 or retract said auxiliary frames 3.1, 3.2 and drive cylinder 5 again.

In the present invention, it is possible by means of said design to generate a very high pressing force with the least possible friction, with a very small design for the lifting unit 6 itself being ensured. Furthermore, it is possible to create a very compact and small design of the overall device R, wherein in a very compact manner, a controller 20 is provided between the auxiliary frames 3.1, 3.2, the drive cylinder 5 is provided directly adjacent thereto between the two frame limbs 2.1, 2.2 of the frame 1, and the lifting unit 6 is provided.

The invention claimed is:

1. A device for transporting freight containers in freight compartments of an aircraft, comprising:
   a power drive unit (PDU) having a drive cylinder mounted in a frame, wherein the drive cylinder is mounted between two auxiliary frames which are pivotably connected by joints to the frame;
   a hollow cylindrical lifting unit, the lifting unit comprises a hollow shaft having at one end a drive output planet gear carrier fixedly connected to a frame limb of the frame, wherein the hollow shaft is rotatably mounted with respect to the frame limb and a drive unit is integrated within the hollow shaft, wherein the drive unit comprises an electric motor and either a single-stage or multi-stage planetary gear set, the drive unit located in the hollow cylindrical lifting unit is associated with the drive cylinder for raising the drive cylinder; and
   a controller is provided between the auxiliary frames in the region of the joints, and in an end-side region of the auxiliary frame, the drive cylinder is provided with rolling elements, wherein the hollow cylindrical lifting unit with hollow shaft and cam disk is arranged at an end of two frame limbs of the frame, wherein the hollow cylindrical lifting unit is in engagement with the rolling elements of the auxiliary frame.

2. The device as claimed in claim 1, wherein the hollow shaft has, at the other end, a motor retaining shaft which engages into the hollow shaft, the motor retaining shaft is connected to a further frame limb which provides support for one or more stators, wherein the hollow shaft is rotatable with respect to the motor retaining shaft.

3. The device as claimed in claim 2, wherein the hollow shaft is provided on both ends with either a cam disk or an eccentric.

4. The device as claimed in claim 1, wherein a rotor of the electric motor is mounted in a rotatable manner between the single-stage or multi-stage planetary gear set and a motor retaining shaft, wherein said rotor meshes with the single-stage or multi-stage planetary gear set.

5. The device as claimed in claim 1, wherein the drive output planet gear carrier is fixed with respect to the frame limb and drives the hollow shaft to perform a rotational oscillating movement.

6. The device as claimed in claim 1, wherein end-side regions of the auxiliary frames are in engagement with a cam disk of the hollow cylindrical lifting unit for raising and lowering the drive cylinder.

* * * * *